United States Patent
Kang et al.

(10) Patent No.: US 9,185,106 B2
(45) Date of Patent: Nov. 10, 2015

(54) ACCESS CONTROL METHOD AND MOBILE TERMINAL WHICH EMPLOYS AN ACCESS CONTROL METHOD

(71) Applicant: SAMSUNG ELECTRONICS CO., LTD., Suwon-Si, Gyeonggi-Do (KR)

(72) Inventors: Myung-Hee Kang, Hwaseong-Si (KR); Dong-Jin Park, Seoul (KR); Jae-Ik Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 3 days.

(21) Appl. No.: 14/179,631

(22) Filed: Feb. 13, 2014

(65) Prior Publication Data

US 2014/0281494 A1 Sep. 18, 2014

(30) Foreign Application Priority Data

Mar. 14, 2013 (KR) .................. 10-2013-0027433

(51) Int. Cl.
| | |
|---|---|
| H04L 29/06 | (2006.01) |
| H04L 9/32 | (2006.01) |
| G06F 21/42 | (2013.01) |
| H04W 12/08 | (2009.01) |
| G06F 21/40 | (2013.01) |
| G06F 21/44 | (2013.01) |

(52) U.S. Cl.
CPC ............ *H04L 63/0823* (2013.01); *G06F 21/40* (2013.01); *G06F 21/42* (2013.01); *G06F 21/44* (2013.01); *H04L 9/3247* (2013.01); *H04L 63/105* (2013.01); *H04W 12/08* (2013.01); *G06F 2221/2115* (2013.01); *H04L 2463/082* (2013.01)

(58) Field of Classification Search
CPC . G06F 21/44; G06F 2221/2115; G06F 21/40; G06F 21/42; H04W 12/08; H04L 2463/082; H04L 63/105; H04L 63/0823; H04L 9/3247
USPC ........................................... 713/155
See application file for complete search history.

(56) References Cited

U.S. PATENT DOCUMENTS 5,214,702 A * 5/1993 Fischer .................. 380/30
6,757,829 B1  6/2004 Laczko, Sr. et al.
(Continued)

FOREIGN PATENT DOCUMENTS

| EP | 1914657 A2 | 4/2008 |
|---|---|---|
| FR | 2765985 A1 | 7/1997 |
| KR | 2010-0026775 A | 3/2010 |

*Primary Examiner* — Saleh Najjar
*Assistant Examiner* — Oleg Korsak
(74) *Attorney, Agent, or Firm* — Volentine & Whitt, PLLC

(57) ABSTRACT

An access control method for accessing an embedded system includes: performing a first access control operation for an access system by a first authentication subject, wherein the first access control operation includes performing a first authentication for the access system; when the first access control operation is passed, receiving at the first authentication subject a result of a second access control operation for the access system which is performed by a second authentication subject that is separate from the first authentication subject performing a second authentication for authenticating whether the access system is an access system that is authenticated by a second authentication subject that is separate from the first authentication subject, and receiving the result of the authentication; and allowing the access system to access the embedded system if the first authentication and the second authentication are successful.

19 Claims, 8 Drawing Sheets

(56) References Cited

U.S. PATENT DOCUMENTS

| | | | |
|---|---|---|---|
| 7,246,375 B1* | 7/2007 | Jean et al. .................. 726/21 |
| 7,849,315 B2 | 12/2010 | Hardy et al. |
| 8,332,641 B2* | 12/2012 | Case et al. .................. 713/168 |
| 2004/0088587 A1* | 5/2004 | Ramaswamy et al. ........ 713/202 |
| 2005/0114530 A1 | 5/2005 | Mangalik et al. |
| 2008/0098466 A1* | 4/2008 | Yoshida et al. .................. 726/5 |
| 2009/0204823 A1 | 8/2009 | Giordano et al. |
| 2009/0327750 A1 | 12/2009 | Wu et al. |
| 2010/0199077 A1 | 8/2010 | Case et al. |
| 2011/0066835 A1 | 3/2011 | Kothari et al. |

\* cited by examiner

1000

1100

1200

ACCESS CONTROL METHOD AND MOBILE TERMINAL WHICH EMPLOYS AN ACCESS CONTROL METHOD

CROSS-REFERENCE TO RELATED APPLICATIONS

This application is based on and claims priority from Korean Patent Application No. 10-2013-0027433, filed on Mar. 14, 2013 in the Korean Intellectual Property Office, the disclosure of which is incorporated herein in its entirety by reference.

BACKGROUND

1. Technical Field

The present invention relates to an access control method, and an apparatus such as a mobile terminal which employs an access control method.

2. Description of the Prior Art

Most embedded systems have debugging ports for debugging. In the case where debugging equipment is used, it becomes possible to read in real time information in an embedded system through a debugging port and also to change a specific register value in the embedded system.

If such a debugging port is not used for debugging only in a development stage, but is used to crack firmware or to steal an encryption key, security functions of products having the security functions, such as Digital Rights Management (DRM), Full Disk Encryption (FDE), and the like, may be easily neutralized.

SUMMARY

Accordingly, it would be desirable to provide an access control method having improved security performance.

It also would be desirable to provide a mobile terminal having improved security performance.

Advantages, subjects, and features of the invention will be set forth in part in the description which follows and in part will become apparent to those having ordinary skill in the art upon examination of the following or may be learned from practice of the invention. According to an aspect of the present invention, there is provided an access control method comprising: performing a first access control operation for an access system by a first authentication subject, wherein the first access control operation includes performing a first authentication for the access system; when the first access control operation is passed, receiving at the first authentication subject a result of a second access control operation for the access system which is performed by a second authentication subject that is separate from the first authentication subject; and allowing the access system to access the first authentication subject when the first access control operation and the second access control operation are passed.

According to another aspect of the present invention, there is provided a mobile terminal, which controls debugging by an access system that accesses the mobile terminal through a debugging port, comprising: a first storage in which is stored a processing module for performing authentication with respect to the access system; a second storage in which is stored an authentication element for the access system; and a counter configured to count the number of times the access system accesses the debugging port, wherein the authentication element stored in the second storage can be accessed only by the processing module.

According to still another aspect of the invention, an apparatus is provided including an embedded system. The apparatus comprises: a debugging system configured to be utilized to debug the embedded system; a debug port configured to selectively interface the debugging system to an access system external to the apparatus; and a debugging access control device configured to selectively enable access to the debugging system by the access system via the debug port when an access control process for the access system is passed, The debugging access control device includes: a first storage in which is stored a processing module for performing authentication with respect to the access system; a second storage in which is stored an authentication element for the access system; and a counter configured to count the number of times the access system accesses the debugging port, wherein the authentication element stored in the second storage can be accessed only by the processing module.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Figure 1:
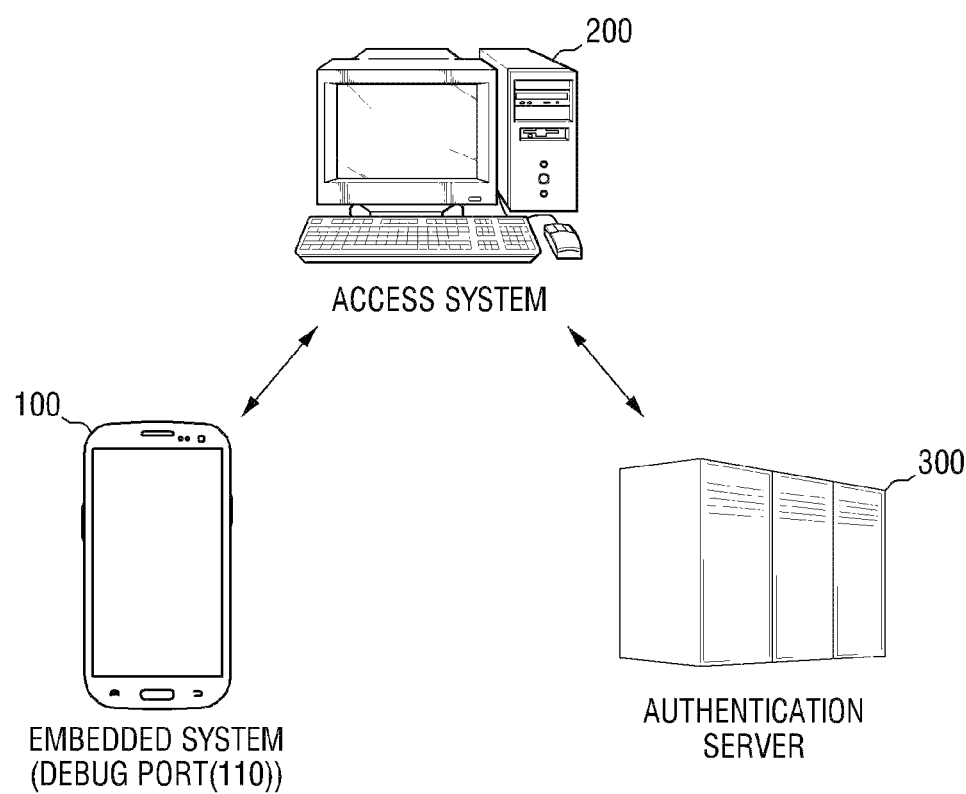
FIG. 1 is a conceptual view illustrating an access control system according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, preferred embodiments of the present invention will be described in detail with reference to the accompanying drawings.

FIG. 1 is a conceptual view illustrating an access control system according to an embodiment of the present invention.

Referring to FIG. 1, an access control system includes an embedded system 100, an access system 200, and an authentication server 300.

Access system 200 may access embedded system 100 in order to perform debugging through a debugging port 110 included in embedded system 100. Access system 200 may be included in, for example, a computing system as illustrated, but is not limited thereto.

Embedded system 100 and authentication server 300 may perform access control with respect to access system 200 that accesses debug port 110 in order to perform debugging, and authorize the debugging by access system 200 if the result of the access control process is successful. Particularly, in this embodiment, each of embedded system 100 and authentication sever 300 may perform access control as an authentication subject. Specifically, embedded system 100 may perform the a first access control operation with respect to access system 200 that accesses debugging port 110 as the first authentication subject, and authentication server 300 may perform a second access control operation with respect to access system 200 only in the case where the first access control operation performed by embedded system 100 has succeeded. Access system 200 can perform the debugging through debugging port 110 only in the case where both the first access control operation and the second access control operation have succeeded. Such an access control method will be described in detail later.

In some embodiments of the present invention, embedded system 100 may be included in, for example, a mobile terminal. More specifically, embedded system 100 may be included in a mobile terminal for communications, such as a smart phone. However, the present invention is not limited thereto, and the kind of electronic appliance on which embedded system 100 is mounted may be changed without limit.

Figure 2:
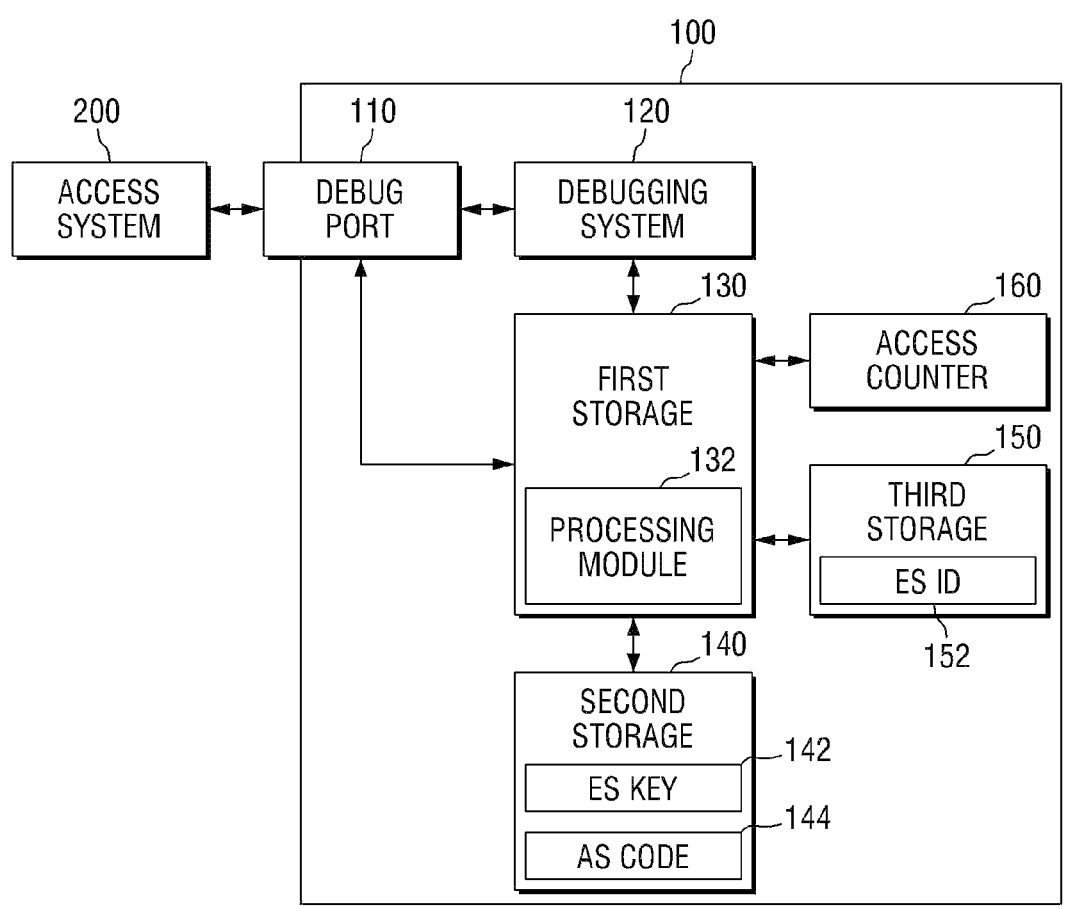
FIG. 2 is a block diagram illustrating the detailed configuration of an embedded system of FIG. 1.

FIG. 2 is a block diagram illustrating the detailed configuration of an embedded system of FIG. 1.

Referring to FIG. 2, embedded system 100 may include a debugging system 120, first to third storages 130, 140, and 150, and an access counter 160.

Debugging system 120 may control the debugging operation of access system 200 that accesses embedded system 100 through debugging port 110. That is, debugging system 120 may serve to control the whole system so that access system 200 performs the debugging operation in the case where access system 200 that accesses debugging system 120 through debugging port 110 is finally authorized to perform the debugging.

A processing module 132, which performs access control with respect to access system 200 that accesses through debugging port 110, may be provided in first storage 130. Processing module 132 may control the whole access control operation that embedded system 100 performs as the authentication subject. Here, the term "module" as used in the embodiment, means a software or hardware component, such as a FPGA or ASIC, which performs certain tasks. However, the "module" does not mean to be limited to software or hardware. The "module" may advantageously be configured to reside on the addressable storage medium and configured to execute on one or more processors. Thus, the "module" may include, by way of example, components, such as software components, object-oriented software components, class components and task components, processes, functions, attributes, procedures, subroutines, segments of a program code, drivers, firmware, microcode, circuitry, data, databases, data structures, tables, arrays, and variables. The functionality provided for in the components and "modules" may be combined into fewer components and "modules" or further separated into additional components and "modules."

On the other hand, processing module 132 may perform an access control with respect to debugging port 110. That is, if access system 200 that accesses debugging port 110 is an unauthorized system, the access of access system 200 through debugging port 110 may be intercepted, and thus access system 200 may be unable to perform the debugging.

First storage 130, in which processing module 132 is stored, may have read-only characteristics. That is, in some embodiments of the present invention, first storage 130 may be, for example, an internal Read Only Memory (ROM), and processing module 132 may be firmware that is stored in the internal ROM. However, the present invention is not limited thereto.

An authentication element may be stored in second storage 140. Such an authentication element may be used for embedded system 100 and the authentication server (300 in FIG. 1) to perform authentication with respect to access system 200.

In this embodiment, to increase reliability of the access control system the authentication element that is stored in second storage 140 may be configured so that the authentication element can be accessed only by processing module 132. Specifically, embedded system 100 may be manufactured and delivered from a warehouse in a state where the authentication element is stored in second storage 140, and embedded system 100 may be configured so that the authentication element that is stored in second storage 140 can be accessed only by processing module 132 while embedded system 100 is used by a user or the like.

In some embodiments of the present invention, the authentication element may include an authentication key 142 of embedded system 100, and an authentication code 144 that is used for validity verification of an authentication server public key certificate (PKC 300 in FIG. 3) to be described later. Here, authentication key 142 may be composed of, for example, 128 bits or 256 bits, and authentication code 144 may be composed of, for example, 256 bits. However, the present invention is not limited thereto, and second storage 140 may be configured to further include other authentication elements in addition to the exemplified one if necessary.

In some embodiments of the present invention, as illustrated, second storage 140 may be arranged separately from first storage 130. That is, first storage 130 and second storage 140 may store information in different ways. For example, in the case where first storage 130 is implemented by an internal ROM, second storage 140 may be implemented by, for example, an e-fuse. However, this is merely exemplary, and second storage 140 may be changed to any other One Time Programmable (OTP) storage medium without limit.

An ID 152 of the embedded system may be stored in third storage 150. ID 152 of the embedded system may be used for the authentication server (300 in FIG. 1) to perform authentication. On the other hand, third storage 150 may be a storage region provided separately from second storage 140 as illustrated. In other words, the security level of second storage 140 may be different from the security level of third storage 150. However, the present invention is not limited the illustrated embodiments. If necessary, third storage 150 may be omitted, and ID 152 of the embedded system may be stored together in first storage 130.

Access counter 160 may count the number of times access system 200 accesses debugging port 110. Particularly, in some embodiments of the present invention, access counter 160 may count the number of times each access system 200 accesses debugging port 110. For example, access counter 160 may separately count the number of times that a first access system and the number of times that a second access system access debugging port 110. Accordingly, in this embodiment, the number of accesses to debugging port 110 may be limited for each access system 200. The details thereof will be described later.

Hereinafter, referring to FIGS. 2 and 3, an access control method according to an embodiment of the present invention will be described.

Figure 3:
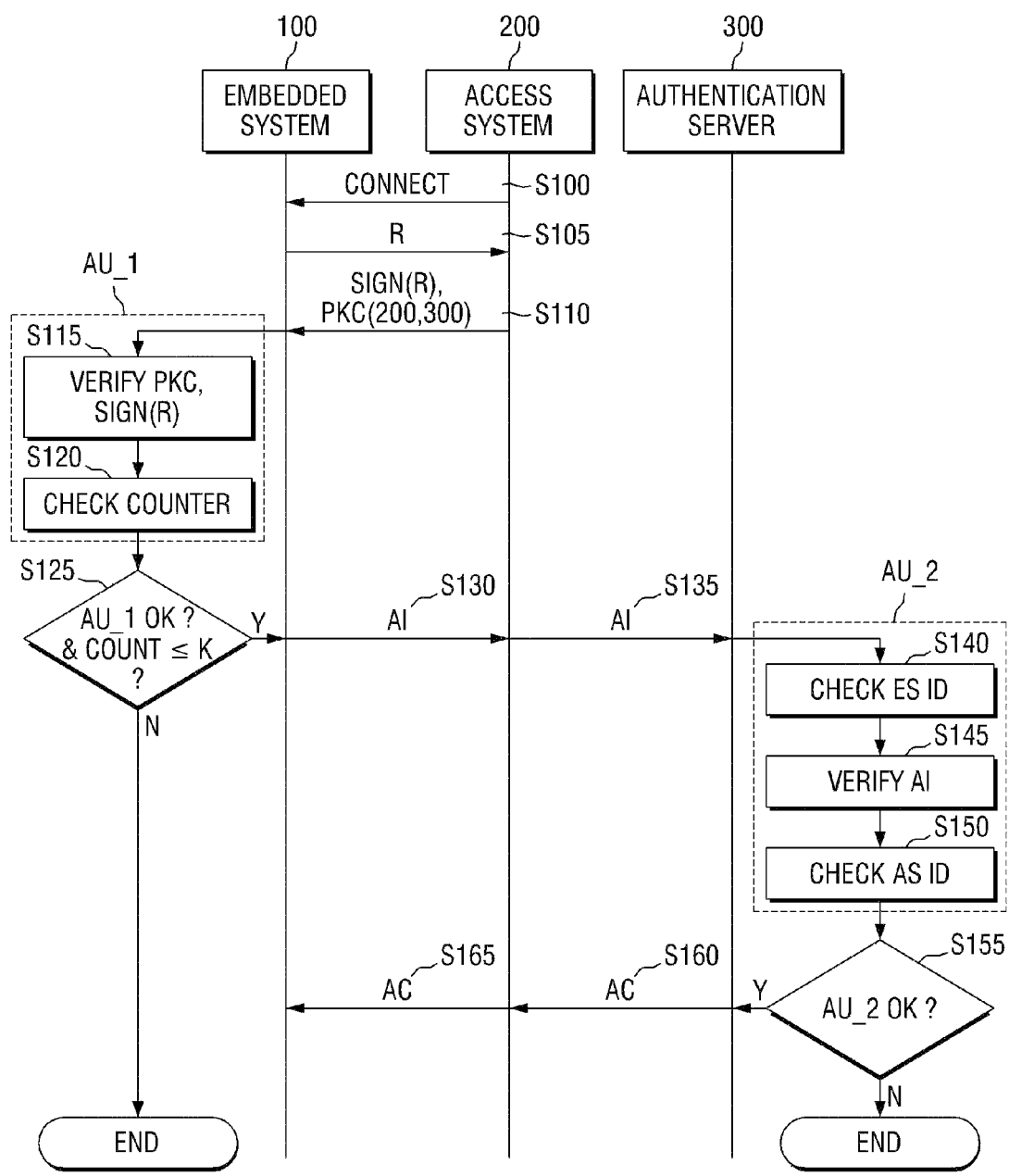
FIG. 3 is a flowchart illustrating an access control method according to an embodiment of the present invention.

FIG. 3 is a flowchart illustrating an access control method according to an embodiment of the present invention.

Referring to FIG. 3, access system 200 first provides an initial communication connection request message to embedded system 100 (S100). Accordingly, embedded system 100, which has received the initial communication connection request message, generates and provides a cryptographically secure random value R to access system 200 (S105). In some embodiments of the present invention, processing module 132 of embedded system 100 as described above may take part in the generation of the random number R.

Next, access system 200, which has received the random value R, generates an electronic signature SIGN(R) with respect to the random value R using an electronic signature key of access system 200 (here, the electronic signature key of access system 200 may be an electronic signature key of a user who intends to access through access system 200). Then, access system 200 transmits the first authentication information SIGN(R) and PKC 200 and 300 including the generated electronic signature SIGN(R), the public key certificate PKC (200) of access system 200, and the public key certificate PKC(300) of authentication server 300 to embedded system 100 (S110).

Next, embedded system 100, which has received the first authentication information SIGN(R) and PKC(200, 300), performs a first access control operation which includes a first authentication AU_1 for authenticating whether access system 200 is an access system 200 that is authenticated by authentication server 300. In this embodiment, the first access control operation includes steps (S115), (S120), and step (S125) as described in greater detail below.

Specifically, in step (S115), embedded system 100 performs a first authentication wherein it verifies validity of the public key certificate PKC(300) of authentication server 300 that is provided from access system 200 through comparison of a resultant value obtained by performing a hash operation of the public key certificate PKC(300) of authentication server 300 that is provided from access system 200 with authentication code 144 stored in second storage 140. Then, embedded system 100 verifies validity of the public key certificate PKC(200) of access system 200 that is provided from access system 200 using the public key certificate PKC(300) of authentication server 300 that has already been verified. Lastly, embedded system 100 verifies validity of the electronic signature SIGN(R) that is provided from access system 200 using the public key certificate PKC(200) of access system 200 that has already been verified).

Next, embedded system 100 confirms the number of times access system 200 accesses debugging port 110 using access counter 160 (S120). Then, in step (S125) it is determined whether the result of the first authentication AU_1 is successful and the number of times access system 200 accesses debugging port 110 is equal to or less than a predetermined value K. If the result of the first authentication AU_1 is successful and the number of times access system 200 accesses debugging port 110 is equal to or less than a predetermined value K, the first access control operation is passed successfully, and in step (S130) embedded system 100 outputs the second authentication information AI to access system 200.

In some embodiments of the present invention, the second authentication information AI may include the secure random value R previously generated by embedded system 100, ID 152 of the embedded system stored in third storage 150 of embedded system 100, the ID of access system 200 that is extracted from the public key certificate PKC(200) of access system 200, and a value obtained by encoding them with a predetermined function (e.g., Hash-based message authentication code (HMAC) value).

By contrast, if the result of the first access control operation fails, either because the first authentication AU_1 is not successful, or because the number of times access system 200 accesses debugging port 110 exceeds the predetermined value K, then embedded system 100 does not output the second authentication information AI, but terminates the access control process.

In some embodiments of the present invention, processing module 132 of embedded system 100 may take part in the determination of whether the first authentication is successful and whether the number of accesses of access system 200 is appropriate.

Next, access system 200, which has received the second authentication information AI from embedded system 100, transfers the second authentication information AI to authentication server 300 (S135). Then, authentication server 300, which has received the second authentication information AI from access system 200, performs a second access control operation, which includes the second authentication AU_2 for authenticating whether embedded system 100 is a valid embedded system 100, whether access system 200 is a registered access system 200, and whether access system 200 is an access system that has succeeded in the first access control operation AU_1 through embedded system 100, based on the second authentication information AI. In this embodiment, the second access control operation includes the second authentication (steps (S140), (S145), and (S150)) and step (S155) as described in greater detail below.

Specifically, authentication server 300 first confirms whether ID 152 of embedded system 100 that is included in the second authentication information AI is a valid ID that is stored in a database of authentication server 300 (S140). Then, authentication server 300 searches for the authentication key of embedded system 100 (if the authentication is successful, the searched authentication key would be the same as authentication key 142 of embedded system 100 that is stored in second storage 140 of embedded system 100) using ID 152 of the embedded system of which the validity has been confirmed, and based on this, authentication server 300 verifies the validity of the encoded value (e.g., HMAC value) that is included in the second authentication information AI (S145). Lastly, authentication server 300 confirms whether the ID of access system 200 that is included in the second authentication information AI is the valid ID that is stored in the database of authentication server 300 (S150).

If the result of the second authentication AU_2 is successful, authentication server 300 issues an attribute certificate AC for access system 200 (S155). Thus if the second access control operation is passed successfully, then authentication server 300 outputs the attribute certificate AC to access system 200 (S160). By contrast, if the result of the second authentication AU_2 is not successful, then the second access control operation is not passed, and authentication server 300 does not output the attribute certificate AC, but terminates the authentication process. Accordingly, the authentication process for access system 200 is not performed any further, but is terminated.

Next, access system 200, which has received the attribute certificate AC from authentication server 300, transfers the attribute certificate AC to embedded system 100 (S165). Then, embedded system 100, which has received the attribute certificate AC from access system 200, verifies the attribute certificate AC. If the verification is completed, processing module 132 of embedded system 100 allows access system 200 to access debugging port 110.

According to this embodiment as described above, in allowing access system 200 to access debugging port 110, embedded system 100 performs the first authentication AU_1 as the first subject and authentication server 300 performs the second authentication AU_2 as the second subject, and thus the security performance of the authentication system can be greatly improved.

Further, since it can be confirmed through the first and second authentications AU_1 and AU_2 whether to discard the public key certificate PKC, the authentication method according to this embodiment can cope with even in a case where a user's secret key is exposed.

Further, in this embodiment, since the access of access system 200 is allowed only with respect to embedded system 100 that is designated by a specific ID and the number of accesses is limited to a predetermined number of accesses, the damage that is caused by any security accident can be minimized.

Hereinafter, referring to FIGS. 2 and 4, an authentication method according to another embodiment of the present invention will be described.

Figure 4:
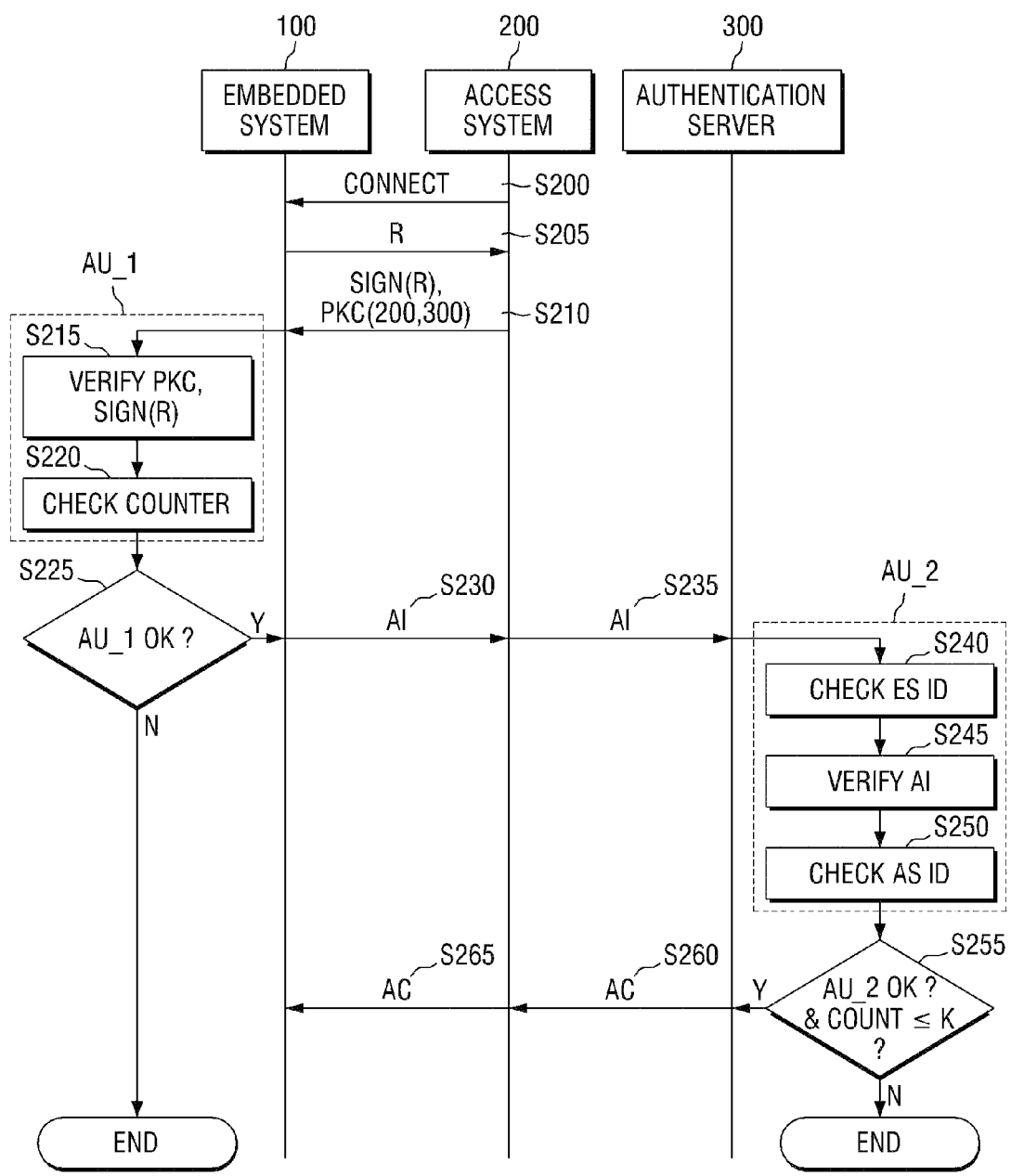
FIG. 4 is a flowchart illustrating an access control method according to another embodiment of the present invention.

FIG. 4 is a flowchart illustrating an authentication method according to another embodiment of the present invention. Hereinafter, the detailed explanation of items duplicate to those according to the above-described embodiment will be omitted, and explanation will be made around the difference between them.

Referring to FIG. 4, access system 200 first provides an initial communication connection request message to embedded system 100 (S200). Accordingly, embedded system 100, which has received the initial communication connection request message, generates and provides a cryptographically secure random value R to access system 200 (S205).

Next, access system 200, which has received the random value R, generates an electronic signature SIGN(R) with respect to the random value R using an electronic signature key of access system 200, and transmits the first authentication information SIGN(R) and PKC 200 and 300 including the generated electronic signature SIGN(R), the public key certificate PKC(200) of access system 200, and the public key certificate PKC(300) of authentication server 300 to embedded system 100 (S210).

Next, embedded system 100, which has received the first authentication information SIGN(R) and PKC(200, 300), performs the first access control operation which includes the first authentication AU_1 for authenticating whether access system 200 is an access system 200 that is authenticated by authentication server 300. In this embodiment, the first access control operation includes steps (S215), (S220), and step (S225) as described in greater detail below.

Specifically, in step (S215) embedded system 100 first verifies validity of the public key certificate PKC(300) of authentication server 300. Then, embedded system 100 verifies validity of the public key certificate PKC(200) of access system 200. Lastly, embedded system 100 verifies validity of the electronic signature SIGN(R) that is provided from access system 200 (S215).

Next, in step (S220) embedded system 100 confirms the number of times access system 200 accesses debugging port 110 using access counter 160. Then, in step (S225) it is determined whether the result of the first authentication AU_1 is successful. If the result of the first authentication AU_1 is successful, then the first access control operation is passed successfully, and in step (S230) embedded system 100 outputs the second authentication information AI to access system 200. At this time, the second authentication information AI may include the number of times access system 200 accesses debugging port 110, the secure random value R previously generated by embedded system 100, ID 152 of the embedded system stored in third storage 150 of embedded system 100, the ID of access system 200 that is extracted from the public key certificate PKC(200) of access system 200, and a value obtained by encoding them with a predetermined function (e.g., Hash-based message authentication code (HMAC) value).

That is, in this embodiment, since embedded system 100 does not determine whether the number of times access system 200 accesses debugging port 110 exceeds a predetermined value K, but authentication server 300 determines this, the embedded system outputs the second authentication information AI that includes the number of times access system 200 accesses debugging port 110.

By contrast, if the result of the first authentication AU_1 is not successful, embedded system 100 does not output the second authentication information AI, but terminates the authentication process. Accordingly, the authentication process for access system 200 is not performed any further, but is terminated.

Next, access system 200, which has received the second authentication information AI from embedded system 100, transfers the second authentication information AI to authentication server 300 (S235). Then, authentication server 300, which has received the second authentication information AI from access system 200, performs the second authentication AU_2 for authenticating whether embedded system 100 is a valid embedded system 100, whether access system 200 is a registered access system 200, and whether access system 200 is an access system that has succeeded in the first authentication AU_1 through embedded system 100, based on the second authentication information AI.

Specifically, authentication server 300 first confirms whether ID 152 of the embedded system that is included in the second authentication information AI is a valid ID that is stored in the database (S240). Then, authentication server 300 searches for the authentication key of embedded system 100 using ID 152 of the embedded system of which the validity has been confirmed, and based on this, authentication server 300 verifies the validity of the encoded value (e.g., HMAC value) that is included in the second authentication information AI (S245). Lastly, authentication server 300 confirms whether the ID of access system 200 that is included in the second authentication information AI is the valid ID that is stored in the database (S250).

If the result of the second authentication AU_2 is successful and the number of times access system 200 accesses debugging port 110, which is included in the second authentication information AI, is equal to or less than the predetermined value K, then the second access control operation is passed successfully, and authentication server 300 issues an attribute certificate AC for access system 200 (S255). Then, authentication server 300 outputs the attribute certificate AC to access system 200 (S260). By contrast, if the result of the second authentication AU_2 is not successful or the number of times access system 200 accesses debugging port 110 exceeds the predetermined value K, then the second access control operation is not passed, and authentication server 300 does not output the attribute certificate AC, but terminates the authentication process. Accordingly, the authentication process for access system 200 is not performed any further, but is terminated.

Next, access system 200, which has received the attribute certificate AC from authentication server 300, transfers the attribute certificate AC to embedded system 100 (S265). Then, embedded system 100, which has received the attribute certificate AC from access system 200, verifies the attribute certificate AC. If the verification is completed, processing module 132 of embedded system 100 allows access system 200 to access debugging port 110.

Even in this embodiment, the security performance of the authentication system can be greatly improved through the configuration that is relatively similar to the configuration according to the above-described embodiment.

Next, referring to FIG. 5, an electronic system that may adopt the embedded system according to embodiments of the present invention will be described.

Figure 5:
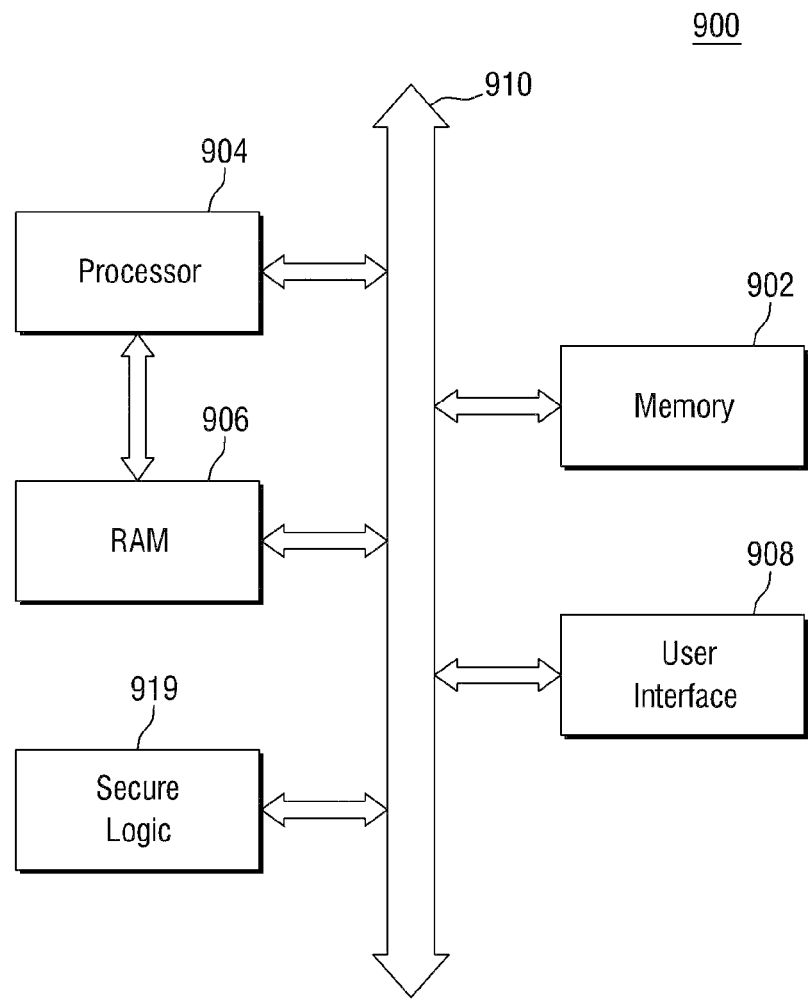
FIG. 5 is a block diagram illustrating the configuration of an electronic system that can adopt an embedded system according to embodiments of the present invention.

FIG. 5 is a block diagram illustrating the configuration of an electronic system that can adopt an embedded system according to embodiments of the present invention.

Referring to FIG. 5, an electronic system 900 may include a memory system 902, a processor 904, a RAM 906, a user interface 908, and a secure logic 919.

Memory system 902, processor 904, RAM 906, user interface 908, and secure logic 919 may perform data communication with each other using a bus 910.

Processor 904 may serve to execute programs and to control electronic system 900, and may include at least one of a microprocessor, a digital signal processor, a microcontroller, and logic devices that can perform similar functions.

RAM 906 may be used as an operating memory of processor 904, and may be implemented by a nonvolatile memory such as a DRAM. Processor 904 and RAM 906 may be packaged into one semiconductor device or a semiconductor package.

User interface 908 may be used to input/output data from/to electronic system 900. Examples of user interface 908 may include a keypad, a keyboard, an image sensor, a display device, a touch-sensitive screen, a mouse, a trackball, etc.

Memory system 902 may store codes for the operation of processor 904, data processed by processor 904, or data input from an outside. Memory system 902 may include a separate controller for driving an error correction block. The error correction block may be configured to detect and correct errors of the data stored in memory system 902 using an error correction code (ECC).

On the other hand, in an information processing system, such as a mobile device or a desk top computer, a flash memory may be mounted as memory system 902. The flash memory may include a Solid State Drive (SSD). In this case, electronic system 900 can stably store large-capacity data in the flash memory.

Memory system 902 may be integrated into one semiconductor device. For example, memory system 902 may be integrated into one semiconductor device to configure a memory card. For example, memory system 902 may be integrated into one semiconductor device to configure a memory card, such as a PC card (Personal Computer Memory Card International Association (PCMCIA) cars), a compact flash (CF) card, a smart media card (SM or SMC), a memory stick, a multimedia card (MMC, RS-MMC, or MMCmicro), an SD card (SD, miniSD, microSD, or SDHC), a universal flash storage device (UFS), or the like.

As secure logic 919, any one of the embedded systems according to the above-described embodiments of the present invention may be adopted.

Figure 6:
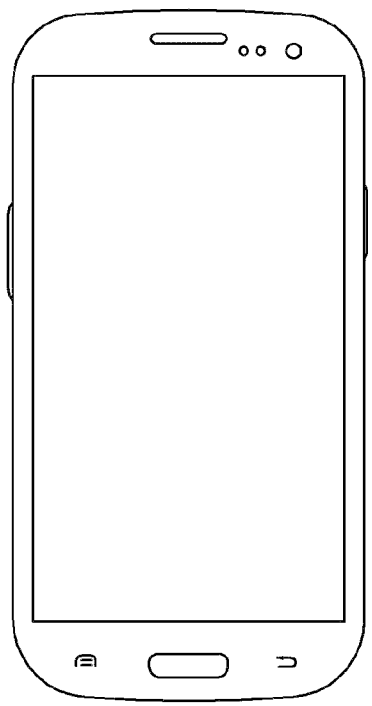
FIG. 6 is a view illustrating an example of the electronic system of FIG. 5 that is applied to a smart phone.

Electronic system 900 illustrated in FIG. 5 may be applied to an electronic control device of various electronic appliances. FIG. 6 is a view illustrating an example of electronic system 900 of FIG. 5 that is applied to a smart phone 1000. In the case where the electronic system (900 in FIG. 5) is applied to smart phone 1000, the electronic system (900 in FIG. 5) may be adopted as a partial constituent element of an Application Processor (AP).

Figure 7:
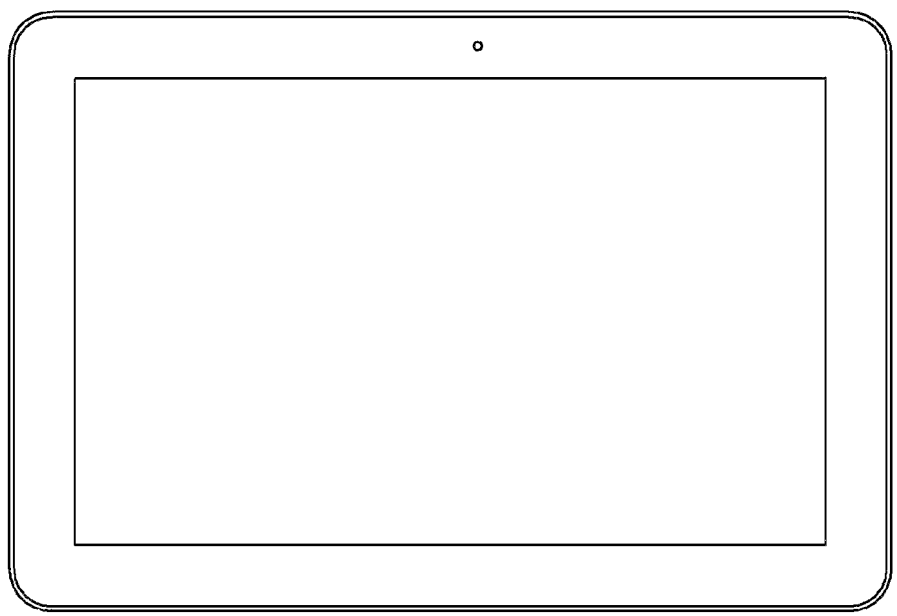
FIG. 7 is a view illustrating an example of the electronic system of FIG. 5 that is applied to a tablet PC.
Figure 8:
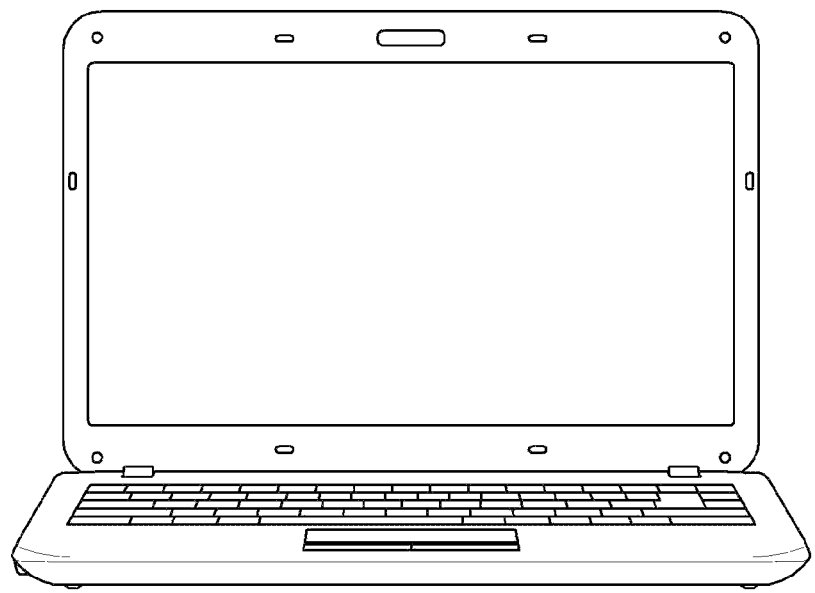
FIG. 8 is a view illustrating an example of the electronic system of FIG. 5 that is applied to a notebook computer.

On the other hand, the electronic system (900 in FIG. 5) may be adopted in other various electronic appliances. FIG. 7 is a view illustrating an example of electronic system 900 of FIG. 5 that is applied to a tablet PC 1100, and FIG. 8 is a view illustrating an example of electronic system 900 of FIG. 5 that is applied to a notebook computer 1200.

In addition, the electronic system (900 in FIG. 5) may be provided as one of various constituent elements of electronic devices, such as a personal computer, an Ultra Mobile PC (UMPC), a work station, a net-book, a Personal Digital Assistant (PDA), a portable computer, a web tablet, a wireless phone, a mobile phone, an e-book, a Portable Multimedia Player (PMP), a portable game machine, a navigation device, a black box, a digital camera, a 3-dimensional television receiver, a digital audio recorder, a digital audio player, a digital picture recorder, a digital picture player, a digital video recorder, a digital video player, a device that can transmit and receive information in a wireless environment, one of various electronic devices constituting a home network, one of various electronic devices constituting a computer network, one of various electronic devices constituting a telematics network, an RFID device, or one of various constituent elements constituting a computing system.

On the other hand, in the case where the electronic system (900 in FIG. 5) is equipment that can perform wireless communication, the electronic system (900 in FIG. 5) may be used in communication systems, such as Code Division Multiple Access (CDMA), Global System for Mobile communication (GSM), North American Digital Cellular (NADC), Enhanced-Time Division Multiple Access (E-TDMA), Wideband Code Division Multiple Access (WCDMA), and CDMA2000.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An access control method executed by a system embedded in a communication device, the method comprising:
   performing, on behalf of an access system, a first access control operation that includes performing a first authentication;
   receiving, when the first access control operation is passed, a result of a second access control operation that is performed by an authentication server on behalf of the access system; and
   allowing the access system to access electronic information secured by the embedded system when the received result indicates the second access control operation is passed.

2. The access control method of claim 1, further comprising:
   receiving, through communication with the access system, first authentication information for the first authentication, wherein
   performing the first authentication comprises verifying whether a public key certificate of the authentication server, a public key certificate of the access system, and an electronic signature provided by the access system, which are included in the first authentication information, are valid.

3. The access control method of claim 2, further comprising:
   transferring second authentication information for the second authentication to the access system, wherein
   the second authentication information includes an identification of the embedded system and an identification of the access system.

4. The access control method of claim 3, wherein:
   the first access control operation further comprises confirming the number of times the access system accesses the embedded system, and
   when the number of accesses is equal to or less than a predetermined value and the first authentication is successful, the second authentication information is transferred to the access system.

5. The access control method of claim 4, wherein when the number of accesses exceeds the predetermined value, the second authentication information is not transferred to the access system, but an authentication process is terminated.

6. The access control method of claim 3, wherein the embedded system is accessed by the access system through a debugging port of the embedded system.

7. The access control method of claim 3, wherein the embedded system is embedded in a mobile terminal, and the authentication server includes a database.

8. A mobile terminal, which controls debugging by an access system that accesses the mobile terminal through a debugging port, comprising:
   a first storage in which is stored a processing module for performing authentication with respect to the access system;
   a second storage in which is stored an authentication element for the access system; and
   a counter configured to count the number of times the access system accesses the debugging port, wherein
   the authentication element stored in the second storage can be accessed only by the processing module.

9. The mobile terminal of claim 8, wherein the authentication element includes an authentication key of the mobile terminal and an authentication code that is used for verification of an authentication server public key certificate received by the mobile terminal from the access system.

10. The mobile terminal of claim 8, wherein the counter counts the number of times each of a plurality of access systems accesses the debugging port.

11. The mobile terminal of claim 8, wherein the first storage and the second storage are arranged separately from each other.

12. The mobile terminal of claim 11, wherein the first storage includes a ROM, and the second storage includes an e-fuse.

13. The mobile terminal of claim 12, wherein the processing module includes firmware that is stored in the first storage.

14. The mobile terminal of claim 8, further comprising a third storage in which an identification of the mobile terminal is stored.

15. An apparatus including an embedded system, the apparatus comprising:
   a debugging system configured to be utilized to debug the embedded system;
   a debug port configured to selectively interface the debugging system to an access system external to the apparatus; and
   a debugging access control device configured to selectively enable access to the debugging system by the access system via the debug port when an access control process for the access system is passed, wherein the debugging access control device includes:
      a first storage in which is stored a processing module for performing authentication with respect to the access system;
      a second storage in which is stored an authentication element for the access system; and
      a counter configured to count the number of times the access system accesses the debugging port,
   wherein the authentication element stored in the second storage can be accessed only by the processing module.

16. The apparatus of claim 15, wherein the processing module is configured to:
   perform a first access control operation for the access system using the authentication element and first authentication information received from the access system via the debug port;
   when the first access control operation is passed, receive a result of a second access control operation for the access system which is performed by an authentication server which is external to the apparatus; and
   allow the access system to access the debugging system when the first access control operation and the second access control operation are passed.

17. The apparatus of claim 16, wherein the first access control operation includes a first authentication, and wherein performing the first authentication comprises verifying whether a public key certificate of the authentication server, a public key certificate of the access system, and an electronic signature provided from the access system, which are included in the first authentication information, are valid.

18. The apparatus of claim 17, wherein the processing module is further configured to transfer second authentication information for the second access control operation to the access system, wherein the second authentication information includes an identification (ID) of the embedded system and an ID of the access system.

19. The access control method of claim 18, wherein the first access control operation further comprises comparing the number of times the access system accesses the debugging port to a predetermined value and wherein when the number of accesses is equal to or less than the predetermined value and the first authentication is successful, then the processing module causes the second authentication information to be transferred to the access system.

* * * * *